(12) United States Patent
Karlovic

(10) Patent No.: US 10,614,977 B2
(45) Date of Patent: Apr. 7, 2020

(54) HAND-HELD TOOL MACHINE

(71) Applicant: C. & E. Fein GmbH, Gmuend-Bargau (DE)

(72) Inventor: Ilija Karlovic, Schwaebisch Gmuend (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 363 days.

(21) Appl. No.: 15/841,374

(22) Filed: Dec. 14, 2017

(65) Prior Publication Data
US 2018/0182577 A1 Jun. 28, 2018

(30) Foreign Application Priority Data

Dec. 22, 2016 (DE) .................. 10 2016 125 435

(51) Int. Cl.
*B25F 5/02* (2006.01)
*H01H 21/06* (2006.01)
(Continued)

(52) U.S. Cl.
CPC ............. *H01H 21/06* (2013.01); *B23Q 5/10* (2013.01); *B24B 23/028* (2013.01); *B25F 5/02* (2013.01);
(Continued)

(58) Field of Classification Search
CPC ........ H01H 21/06; H01H 21/10; H01H 21/24; H01H 2235/01; B23Q 5/10; B24B 23/028; B25F 5/02
(Continued)

(56) References Cited

U.S. PATENT DOCUMENTS 2,346,778 A * 4/1944 Mitchell ............... B23B 45/001
173/170
2,636,136 A * 4/1953 Gubbins ................ H02K 7/145
310/50
(Continued)

FOREIGN PATENT DOCUMENTS

DE 3638952 A1 5/1988
DE 19707215 A1 9/1997
(Continued)

OTHER PUBLICATIONS

European Search Report dated Feb. 16, 2018 from corresponding European Patent Application No. 17204688.0, 7 pages.
(Continued)

*Primary Examiner* — Robert F Long
(74) *Attorney, Agent, or Firm* — Muncy, Geissler, Olds & Lowe, P.C.

(57) ABSTRACT

A hand-held tool machine comprising a housing is disclosed wherein a motor for driving a tool as well as a switch for switching on and off the motor are received, including a switching arrangement having a switch that can be moved between a non-activated position and an activated position for activating the switch, and including a locking arrangement that can be moved between a blocking position and a release position, wherein the switch lever can only be moved into the activated position, when the locking arrangement is in the release position, and wherein the locking arrangement allows for a locking of the switch lever in the activated position, wherein the locking arrangement includes a slider that is received on the switch lever slidable between a locking position and a release position, wherein on the slider there is provided a blocking element cooperating with a counter element arranged at the housing for blocking a movement of the switch lever into the activated position when being in the blocking position and for allowing a
(Continued)

movement of the switch lever into the activated position upon shifting the slider into the release position, and wherein on the slider there is provided a latching element that cooperates with a counter element on the housing for allowing a latching of the switch lever in the activated position.

20 Claims, 6 Drawing Sheets

(51) Int. Cl.
    *B23Q 5/10*     (2006.01)
    *B24B 23/02*     (2006.01)
    *H01H 21/10*     (2006.01)
    *H01H 21/24*     (2006.01)

(52) U.S. Cl.
    CPC ............ *H01H 21/10* (2013.01); *H01H 21/24* (2013.01); *H01H 2235/01* (2013.01)

(58) Field of Classification Search
    USPC ...................................... 173/162.1, 170, 213
    See application file for complete search history.

(56) References Cited

U.S. PATENT DOCUMENTS

| | | | | |
|---|---|---|---|---|
| 3,746,813 A * | 7/1973 | Brown | .................... | H01H 13/62 200/43.17 |
| 3,847,233 A * | 11/1974 | Glover | .................... | A01G 3/053 173/170 |
| 4,016,941 A * | 4/1977 | Sanders | ................. | B23D 29/00 173/170 |
| 4,296,290 A * | 10/1981 | Peot | ....................... | H01H 13/62 200/325 |
| 4,646,982 A * | 3/1987 | Spring | .................... | D05B 59/00 112/279 |
| 4,986,369 A * | 1/1991 | Fushiya | .................. | B25B 21/00 173/178 |
| 5,681,214 A * | 10/1997 | Kleider | .................. | B23D 45/16 451/344 |
| 2006/0055369 A1 | 3/2006 | Duesselberg | ............. | B25F 5/02 320/112 |
| 2007/0011884 A1* | 1/2007 | Hua | ....................... | B25B 21/00 30/276 |
| 2008/0066941 A1* | 3/2008 | Kobayashi | ............. | B25B 21/00 173/218 |
| 2009/0071998 A1* | 3/2009 | Nakano | .................. | B25C 1/008 227/8 |
| 2009/0108046 A1* | 4/2009 | Huang | .................... | B25C 1/008 227/8 |
| 2010/0012700 A1* | 1/2010 | Perron | .................... | B25C 1/043 227/8 |
| 2010/0116863 A1* | 5/2010 | Suda | ....................... | B25C 1/008 227/8 |
| 2010/0206933 A1* | 8/2010 | Wu | ........................... | B25C 1/08 227/8 |
| 2010/0301091 A1* | 12/2010 | Liang | ..................... | B25C 1/008 227/8 |
| 2011/0057014 A1* | 3/2011 | Yang | ....................... | B25C 1/008 227/8 |
| 2011/0062207 A1* | 3/2011 | Hlinka | ................... | B25C 1/008 227/8 |
| 2011/0062208 A1* | 3/2011 | Hlinka | ................... | B25C 1/008 227/8 |
| 2011/0114692 A1* | 5/2011 | Liang | ..................... | B25C 1/04 227/2 |
| 2011/0132959 A1* | 6/2011 | Hlinka | ................... | B25C 1/008 227/8 |
| 2011/0227429 A1 | 9/2011 | Takeda et al. | | |
| 2011/0240709 A1* | 10/2011 | Oouchi | .................... | B25C 1/08 227/8 |
| 2011/0308920 A1* | 12/2011 | Shi | ............................ | B25F 5/00 200/43.17 |
| 2012/0037682 A1* | 2/2012 | Ho | ........................... | B25C 1/008 227/8 |
| 2012/0048585 A1* | 3/2012 | Miyazawa | ............. | B23D 51/00 173/170 |
| 2012/0104069 A1* | 5/2012 | Chien | ..................... | B25C 1/008 227/2 |
| 2013/0140051 A1* | 6/2013 | Rudolph | ................... | B25F 5/00 173/18 |
| 2013/0277189 A1 | 10/2013 | Yuan | | |
| 2013/0341169 A1* | 12/2013 | Kuhnle | ................... | H01H 9/06 200/337 |
| 2014/0174772 A1* | 6/2014 | Mandalka | ................. | B25F 5/02 173/1 |
| 2014/0290973 A1* | 10/2014 | Lin | .......................... | B25F 5/02 173/104 |
| 2014/0349556 A1* | 11/2014 | Zhang | ...................... | B25F 5/02 451/359 |
| 2015/0097641 A1 | 4/2015 | Chen | | |
| 2015/0170848 A1 | 6/2015 | Kannan et al. | | |
| 2017/0358909 A1* | 12/2017 | Ballard | ................... | B25B 27/10 |
| 2018/0021933 A1* | 1/2018 | Cheng | ..................... | B25B 21/00 173/169 |
| 2018/0161951 A1* | 6/2018 | Billings | ................. | B23Q 17/00 |
| 2018/0366286 A1* | 12/2018 | Moreland, IV | ........ | H01H 21/22 |
| 2019/0291192 A1* | 9/2019 | Hart | ....................... | B23D 45/042 |

FOREIGN PATENT DOCUMENTS

| | | |
|---|---|---|
| DE | 20 2013 105 442 U1 | 4/2014 |
| DE | 102012223931 A1 | 6/2014 |
| DE | 10 2013 212 907 A1 | 1/2015 |
| EP | 2207191 A2 | 7/2010 |
| EP | 2319662 A1 | 5/2011 |
| EP | 2939792 A2 | 11/2015 |
| JP | 11-277462 | 10/1999 |

OTHER PUBLICATIONS

German search report for the corresponding application DE102016125435.5, dated Sep. 25, 2017, 8 pages.

* cited by examiner

HAND-HELD TOOL MACHINE

CROSS-REFERENCES TO RELATED APPLICATIONS

This application claims priority from German patent application 102016125435.5, filed on Dec. 22, 2016. The entire content of this priority application is incorporated herein by reference.

BACKGROUND OF THE INVENTION

The invention relates to a hand-held tool machine comprising a housing within which a motor for driving a tool and a switch for switching on and off the motor are received, further comprising a switching arrangement including a switch button movable between a non-activated position and an activated position for activating the switch, and further comprising a locking arrangement movable between a blocking position and a released position, wherein the switch lever can only be moved into the activated position, when the locking arrangement is in the release position, and wherein the locking arrangement in the activated position allows a moving of the push-button into a latching position.

Such a hand-held tool machine is known from EP 2 207 181 A2.

In particular with angle grinders it is common to utilize a switch lever within the rear region of the housing that can be gripped with one hand for moving the switch lever between a non-activated and an activated position for activating a switch for switching on and off the motor. Herein a locking arrangement is provided that impedes an activation of the switch lever, as long as the locking arrangement is in a blocking position. To allow for moving of the switch lever into the activated position first the locking arrangement must be moved into a release position.

Such a locking arrangement shall avoid that the angle grinder starts up inadvertently upon gripping. In addition the switch lever shall automatically move into its non-activated position upon release so that the motor is switched off and possibly a breaking of the angle grinder is activated. If the switch lever is in its activated position and thus the motor starts up, then the latter can be latched to allow a simplified handling of the angle grinder during a longer operation.

The hand-held tool machine mentioned before fulfills these functions. In, a similar way also functions a hand-held tool machine known from EP 2 319 662 A1.

The switching arrangements of the known hand-held tool machines are of a relatively complicated design and have a relatively complicated handling.

SUMMARY OF THE INVENTION

In view of this it is one aspect of the present invention to disclose a hand-held tool machine having safety functions necessary for an angle grinder such as avoiding inadvertent start-up.

It is another aspect of the invention to disclose a hand-held tool machine having a rather simple construction.

It is another aspect of the invention to disclose a hand-held tool machine allowing a rather simple handling.

It is another aspect of the invention to disclose a hand-held tool machine allowing an easy assembly.

It is another aspect of the invention to disclose a hand-held tool machine having a very reliable design.

According to the invention these and other aspects are met by a hand-held tool machine comprising:

a housing;
a motor received within said housing for driving a tool;
a switch received within said housing for switching on and off said motor;
a switching arrangement received within said housing, said switching arrangement comprising:
    a switch lever that can be moved between a non-activated position and an activated position for activating said switch;
    a locking arrangement received on said switch lever allowing to move said switch lever between a blocking position and a release position;
    a slider received on said switch lever allowing shifting said slider between said blocking and said release positions;
    a blocking element received on said slider, said blocking element cooperating with a counter element received on said housing for blocking said slider within said blocking position against moving of said switch lever into said activated position and for allowing moving said switch lever into said activated position upon shifting said slider into said release position;
    a latching element received on said slider cooperating with a counter element received in said housing for allowing latching said switch lever when being in its activated position;
    wherein said switch lever can only be moved into said activated position, when said locking arrangement is in said release position.

While according to the prior art the locking arrangement cooperating with the switch lever comprises a switch lever that is pivotable against a spring bias by means of which the blocking function in the non-activated position of the switch lever is ensured, and upon activation of which the switch lever can be moved into its activated position, according to the invention a locking arrangement including a slider arranged on the switch lever is provided that allows for the blocking and release functions, respectively. In addition, when being in the activated position a latching of the switch lever can be ensured by means of the slider to thereby achieve the latching position. In the latching position the switch is activated so that the motor is powered up.

In this way a particularly simple and robust design and a simple handling are reached.

According to another aspect of the invention the slider is biased into the blocking position.

In this way it is ensured that the slider in its starting position always is in the blocking position, so that the switch lever cannot be easily activated.

According to another aspect of the invention the switch lever at one end is held pivotably and biased by means of a spring into the direction of the non-activated position.

This allows for a simple operation of the switch lever when being activated during operation.

According to another aspect of the invention the blocking element is configured as a step protruding from the slider and in the blocking position resting against an assigned protrusion of the housing.

In this way a robust blocking possibility is provided.

According to another aspect of the invention the slider comprises an activation element that protrudes through an opening of the switch lever to the outside.

In this way a simple movement of the slider between the blocking position and the release position is made possible.

According to another aspect of the invention the activating element is configured as a button that is configured for sliding the slider between the blocking position and the release position by means of a finger of the user.

This allows for a very simple operation.

According to a further feature of the invention the slider is biased by means of a spring into the latching position, and the latching element can be latched at the seating against the action of the spring bias.

In this way a very simple latching of the switch lever is made possible in the activated position.

According to another development of this design the switching arrangement in the latching position of the switch lever allows for a further pivoting against the action of the bias of the spring into a release position within which the locking arrangement is released from the seating and can be moved by means of the spring into the direction of the blocking position.

This is a further safety feature, since during normal working the machine in the latching position of the switch lever is held at the handle at which the switch lever is received. If the motor shall be stopped, then only the switch lever must be further depressed by a small amount against the action of the spring bias, whereby then the latching element is released under the action of the bias of the assigned spring. Upon subsequent release of the switch lever thus the motor is stopped and possibly an assigned breaking device is activated.

According to a further feature of the invention the switch comprises a switch plunger that can be switched by means of the switch lever when the switch lever is moved into its activated position.

This allows for a reliable switching of the switch.

According to a further development of the invention the slider can be inserted from an inner side facing the housing and be biased by means of the spring and can be mounted together with the switch lever between two housing parts.

In this way a simple mounting of the switching arrangement is made possible.

It will be understood that the features mentioned before and to be explained hereinafter cannot only be used in the respectively given combination but also in different combinations or independently, without departing from the scope of the invention

BRIEF DESCRIPTION OF THE DRAWINGS

Further features and advantages of the invention can be taken from the subsequent description of a preferred embodiment with reference to the drawings. In the drawings show.

DESCRIPTION OF PREFERRED EMBODIMENTS

Figure 1:
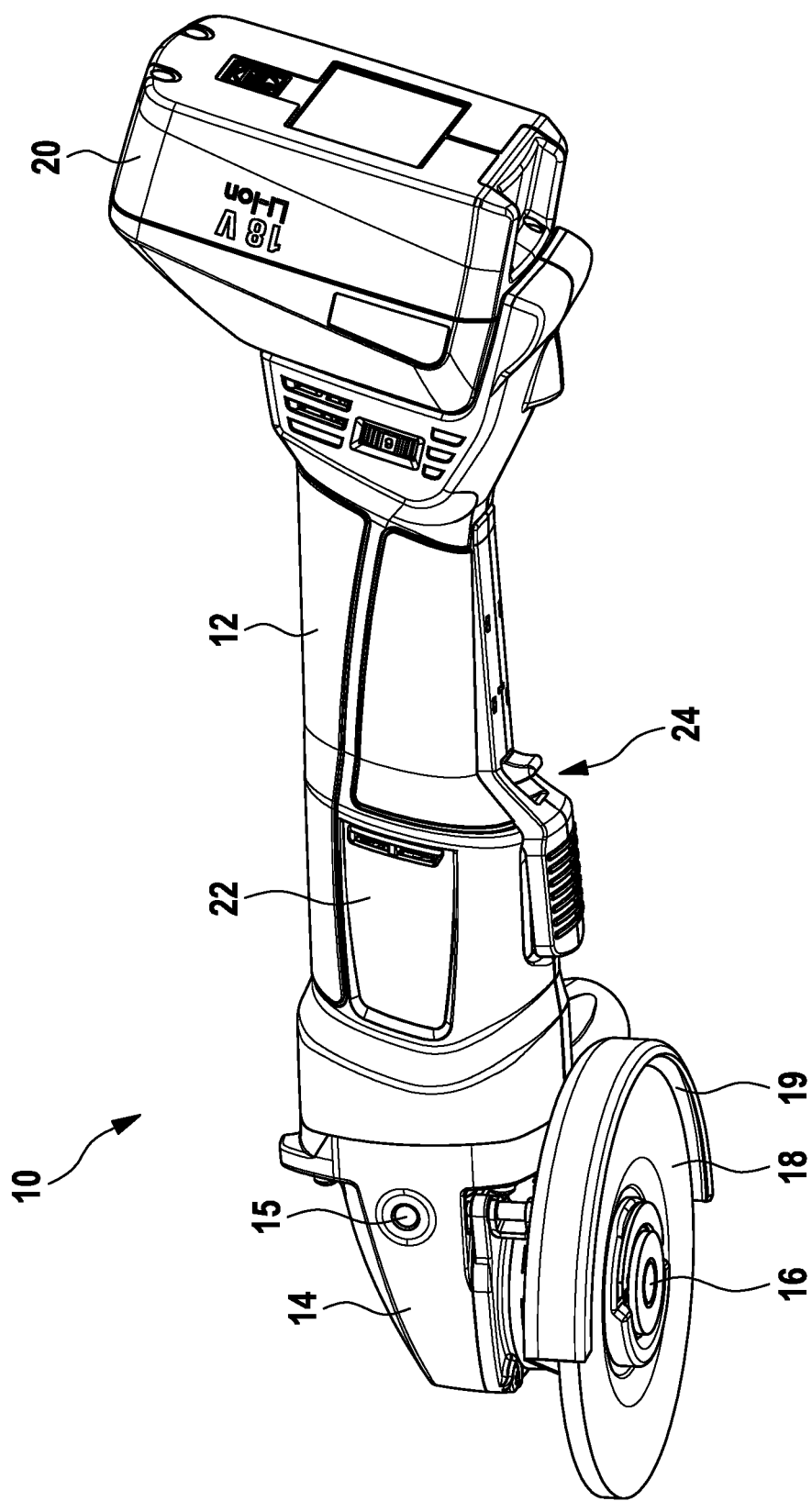
FIG. 1 a perspective view of a hand-held tool machine according to the invention which exemplarily is configured as an accumulator-driven angle grinder.

The hand-held tool machine designated in total with 10 shown in FIG. 1 comprises a longitudinal housing 12 around which the hand-held tool machine 10 can be gripped with one hand. In the front region of the housing 12 a motor is received that herein is only depicted with numeral 22. At the outer end of the housing 12 a gear head 14 is provided whereon at both sides a seating 15 for mounting a shaft handle is provided. From the gear head 14 a tool spindle protrudes that is only depicted herewith 16. At the tool spindle 16 a tool 18 configured as a roughing disk or a separating disk is mounted releasably, while in addition a protection hood 19 is provided in a known way.

At the rear end of the housing 12 an accumulator 20 is secured releasably. At the lower side of the housing 12 a switching arrangement designated in total with 24 is provided by means of which an activation of the motor 22 is controlled.

During operation the hand-held tool machine typically is held with one hand at a shaft handle that is screwed into the seating 15 on the right or left side, and with the other hand is held by gripping around the housing at its rear end, so that the switching arrangement 24 can be activated.

The design and functioning of the switching arrangement 24 in the following are described in more detail according to FIGS. 2 to 9.

Figure 2:
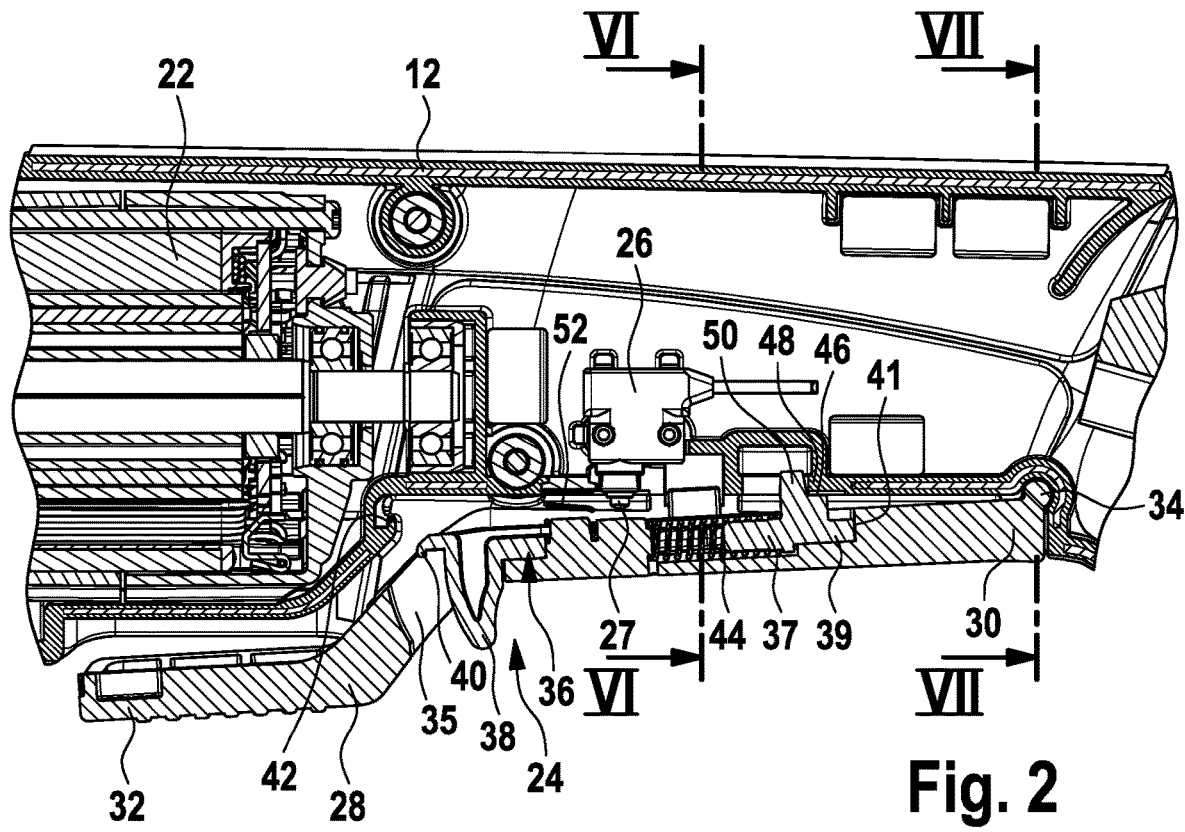
FIG. 2 a partial longitudinal section of the hand-held tool machine according to FIG. 1 shown in the region of the switching arrangement, with non-activated switch lever in the blocking position.

The switching arrangement 24 according to FIG. 2 comprises a switch lever 28, which at its first end 30 is received on the housing 12 by means of a pivot stud 34. The switch lever 28 can be pivoted about the pivot stud 34 and is biased by means of a spring 52 into its non-activated position to the outside so that the second end 32 of the switch lever according to FIG. 2 in the non-activated position protrudes to the outside.

Within the switch lever 28 a locking arrangement is received that is designated in total with 36. The locking arrangement 36 comprises a slider 37 that can be shifted at the inner side of the switch lever 28 between a blocking position shown in FIG. 2 and a release position within which the slider 37 is shifted to the front into the direction of the gear head 14. The slider 37 at its front end facing the gear head 14 comprises an activation element 38 being configured as rounded knob having an almost triangular cross section and protruding through a recess 35 of the switch lever 28 to the outside. The slider 37 is biased by means of a spring 44 into its blocking position according to FIG. 2 so that the slider is held in its end position within which the slider 37 rests with its second end 39 against an end of the recess 41 within the switch lever 28.

In this position a blocking element 46 being configured as a step protrudes from the slider into the direction of the inner side of the housing 12 and rests against an assigned counter element 48 of the housing 12. Thus in this blocking position a movement of the switch lever 28 by means of a pivoting is impeded.

Within the housing 12 a switch 26 is received that is configured for switching on and off the motor 22. The switch 26 comprises a switch plunger 27 that protrudes from the switch 26 into the direction of the switch lever 28. If the switch lever 28 after a corresponding movement of the locking arrangement 36 into a release position (as will be subsequently described) pivots with its second end 32 into the direction of the housing 12, then the switch plunger 27 is activated by the lower side of the switch lever 28 so that the switch 26, that may be configured as a key button, moves into its on-position.

Figure 3:
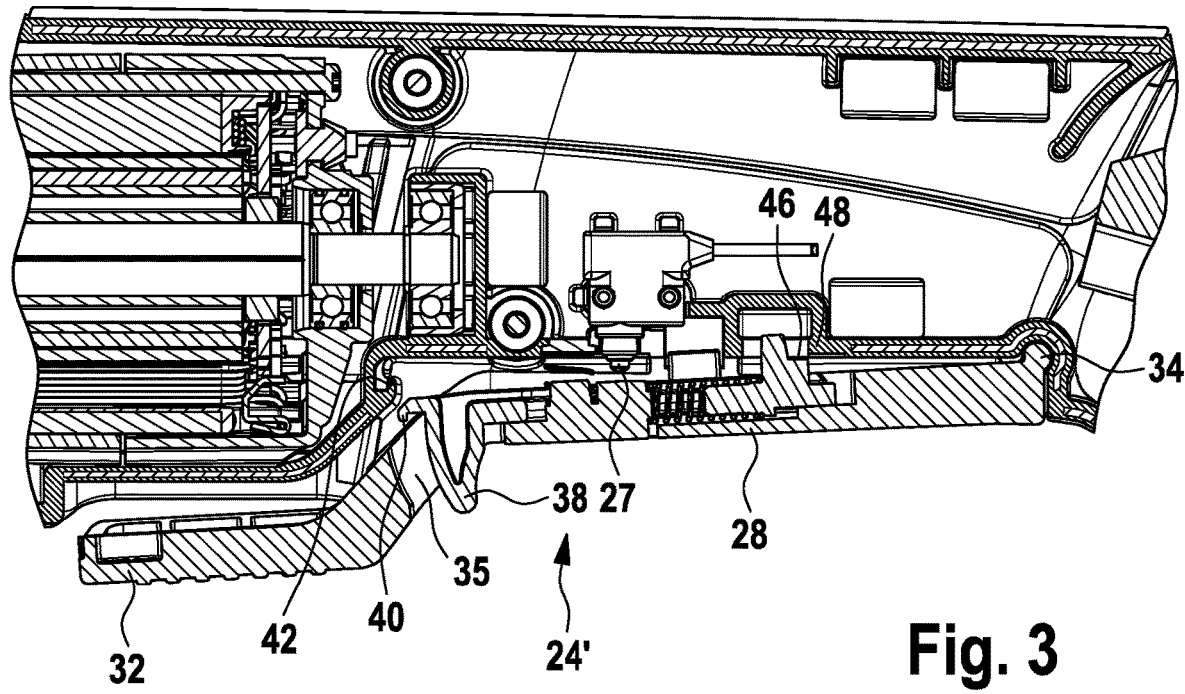
FIG. 3 a partial longitudinal section of the hand-held tool machine according to FIG. 1 shown in the region of the switching arrangement, wherein, however, the slider has been shifted into the release position.

If the slider 37 is shifted against the action of the spring bias to the front into the direction of the gear head 14 by activating the activation element 38 by means of a finger, then the blocking element 46 is released from its counter element 48 so that the position of the locking arrangement designated in total with 24' according to FIG. 3 is reached.

Figure 4:
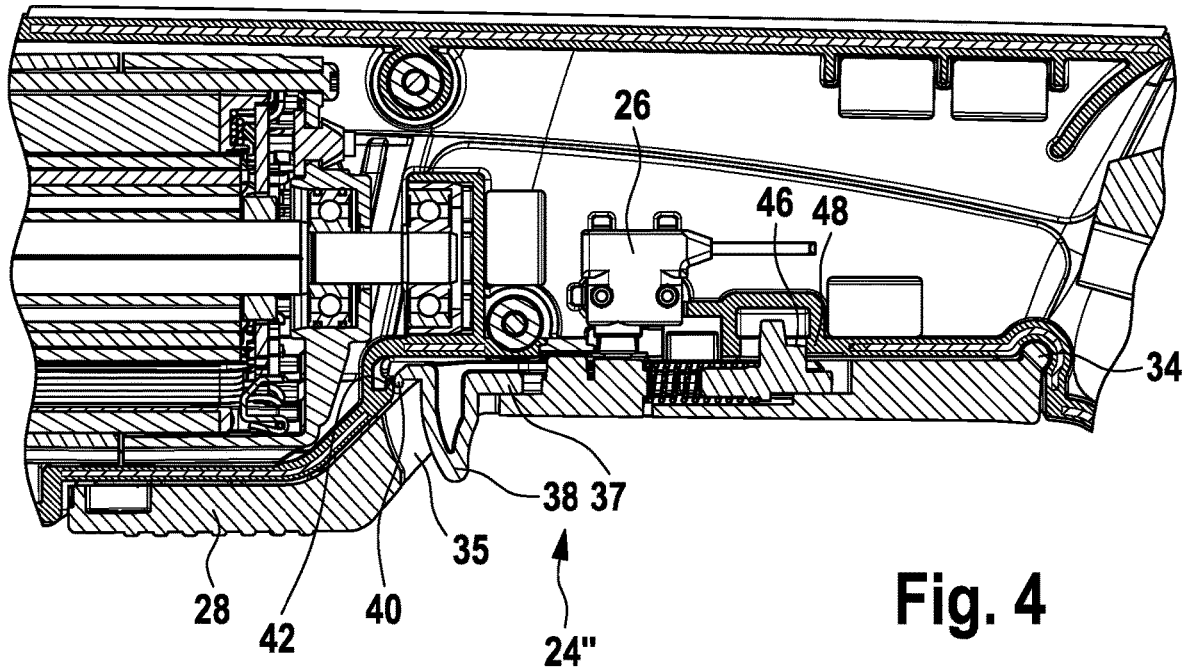
FIG. 4 a partial longitudinal section of the hand-held tool machine according to FIG. 1 shown in the region of the switching arrangement, wherein however the switch lever has been activated.

In this position the switch lever 28 can now be pivoted into the direction of the housing 12 so that the switch plunger 27 is activated and the position according to FIG. 4 is reached that is designated in total with 24". The motor 22 thus is switched on. The hand-held tool machine 10 now in this position could be further held while the motor 22 is running, as long as the switch lever 28 is kept in its activated position such as by gripping around with one hand.

The switching arrangement 24 in addition is also configured to allow a latching of the switch lever 24 in the activated position. At the front end of the slider 37 there is provided a latching element 40 configured as a latching lug to which a seating or counter element 42 at the housing 12 is assigned.

If the slider 37 starting from the position according to FIG. 4 is shifted by means of the activation element 38 to the front into the direction of the gear head 14, then the latching element 40 latches with the seating or counter element 42 and thus holds the switch lever 28 in its activated, switched-on latching position so that the motor is permanently switched on. The position according to FIG. 5 is reached that is depicted with 24'''.

Figure 5:
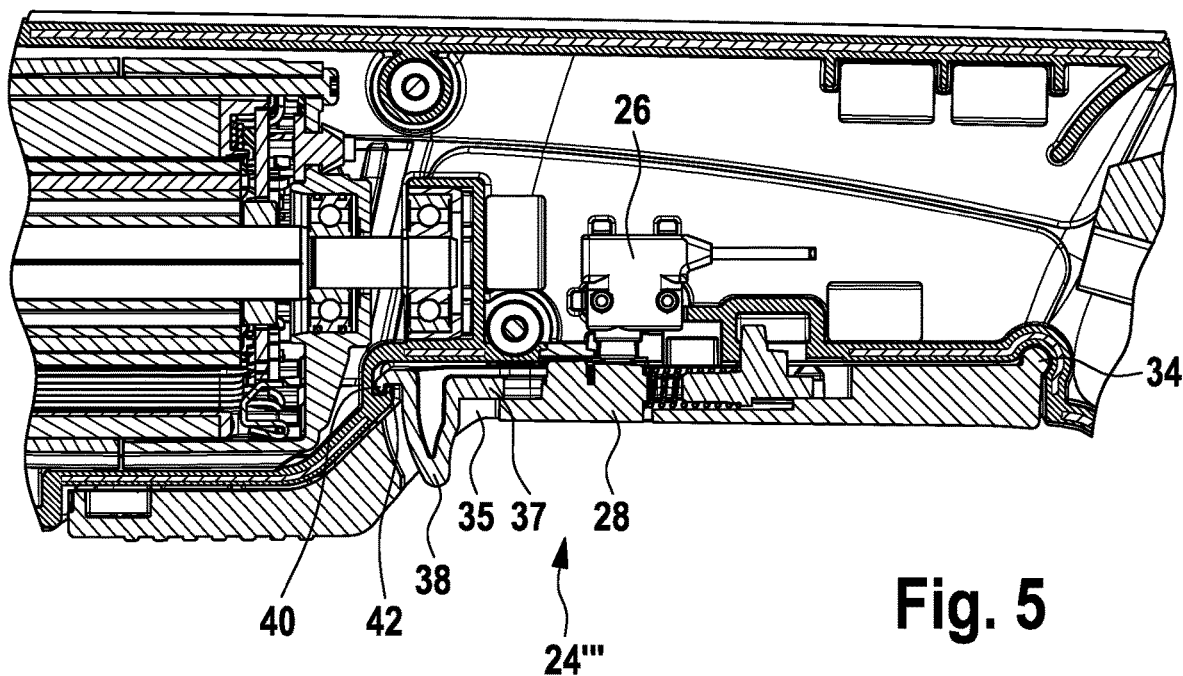
FIG. 5 a partial longitudinal section of the hand-held tool machine according to FIG. 1 shown in the region of the switching arrangement, wherein the switch lever has been activated and the slider has been moved into the latching position.

If the motor 22 shall be stopped, then starting from the position according to FIG. 5 the switch lever 28 must only be tightened against the action of the spring 52 so that the latching element 40 is again released from the assigned seating 42 of the housing, and under the action of the spring 44 moves again to the rear into the direction of the first end 30 of the switch lever. If now the switch lever 28 is released, then under the action of the spring 52 it moves into the non-activated position so that the motor 22 is switched off and possibly in addition a braking action is performed. In this position the slider 37 can move until its end position so that it reaches again its blocking position.

Figure 7:
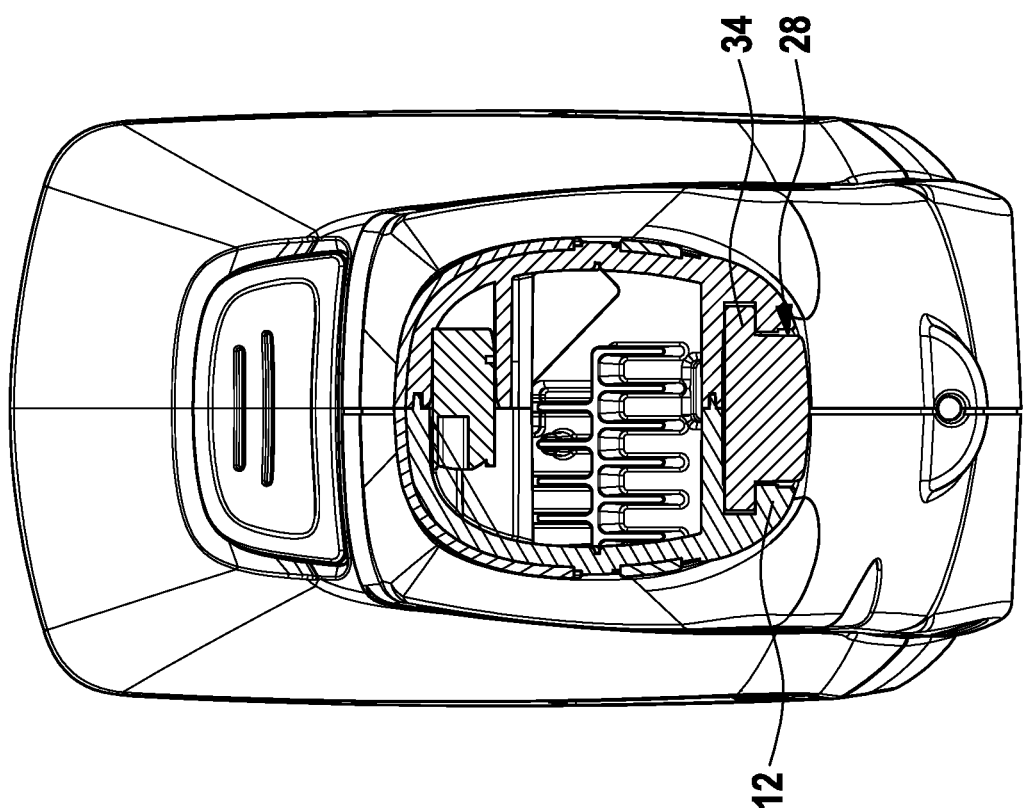
FIG. 7 a cross section through the hand-held tool machine according to FIG. 4 along the line VII-VII.
Figure 6:
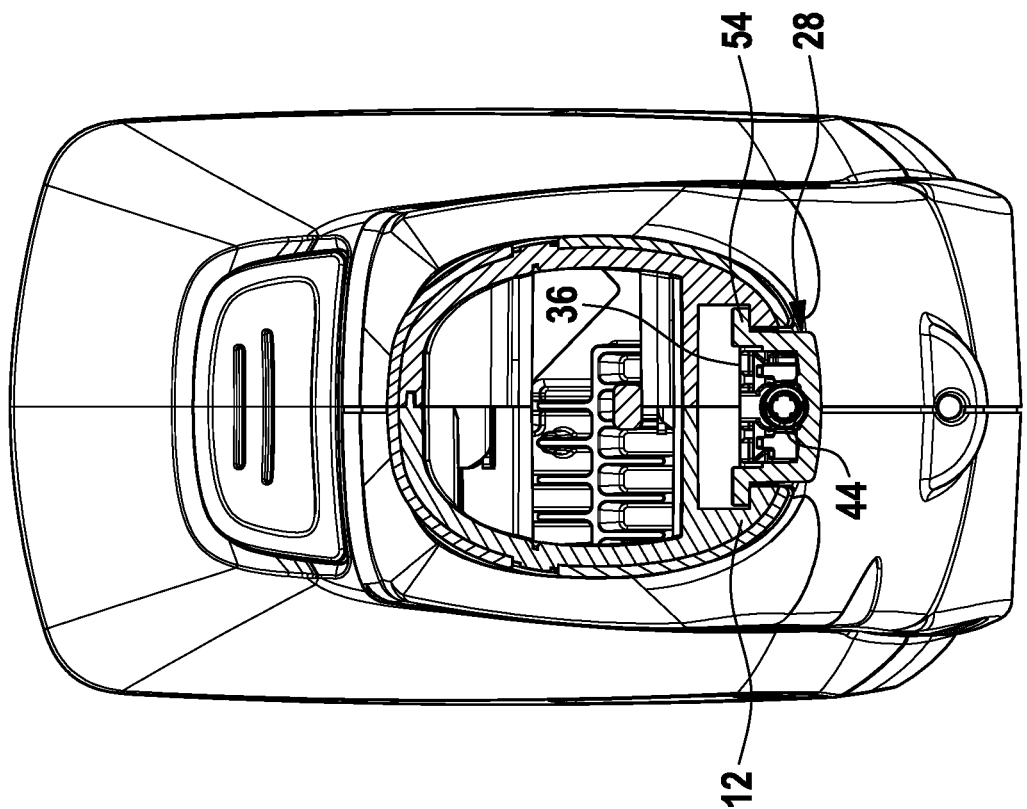
FIG. 6 a cross section through the hand-held tool machine according to FIG. 4 along the line VI-VI.

The sections according to FIGS. 6 and 7 show how the switch lever 28 is held at the housing 12 with its two lateral protrusions 54 in its non-activated position and, respectively, switch lever 28 is held pivotably with its pivot axis or stud 34 within the housing 12.

Figure 8:
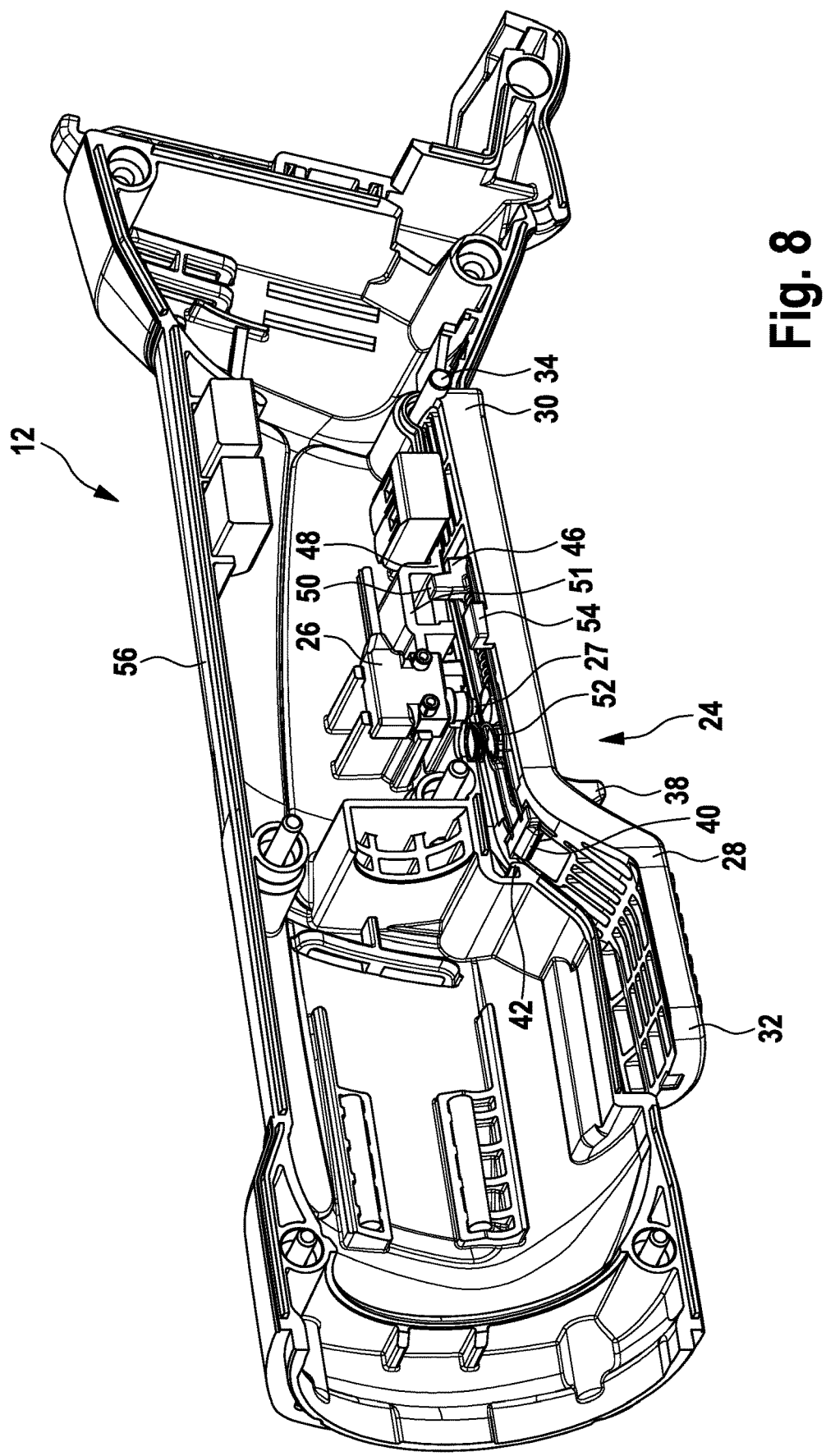
FIG. 8 a perspective representation of a housing part seen from the inside and including a mounted switching arrangement.

From FIG. 8 it can be seen that in addition there is provided a protrusion 50 arranged adjacent to the blocking element 46 and sticking out into the direction of the inner side of the housing that can be shifted within an assigned recess 51 of the housing 12. The protrusion 50 thus limits the shifting of the slider 37 between the blocking position and the release position.

Figure 9:
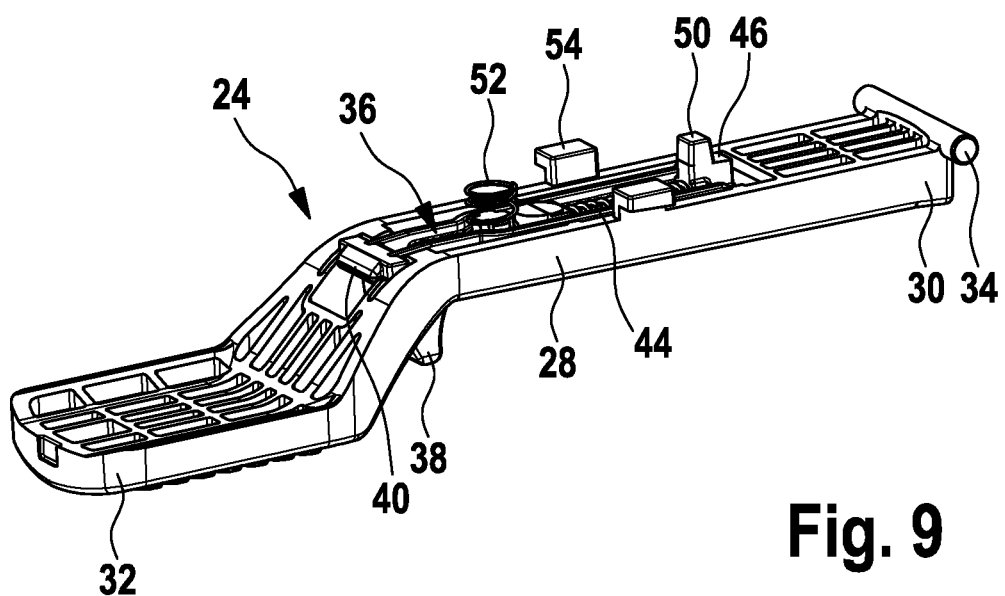
FIG. 9 a switch lever including a mounted locking arrangement shown in perspective representation.

For mounting the locking arrangement 36 at the switch lever 28 the slider 37 according to FIG. 9 is inserted into an assigned recess 41 of the switch lever 28 as in a key hole and biased with the spring 44. Now the locking arrangement is received on the switch lever 28 a pre-assembled state and can be mounted in this state on the housing 12 before assembling the two assigned housing parts according to FIG. 8. In FIG. 8 only one housing part 56 is shown.

What is claimed is:

1. A hand-held tool machine comprising:
   a housing;
   a motor received within said housing for driving a tool;
   a switch received within said housing for switching on and off said motor;
   a switching arrangement received within said housing, said switching arrangement comprising:
      a switch lever that can be moved between a non-activated position and an activated position for activating said switch, said switch lever being biased into said non-activated position;
      a locking arrangement received on said switch lever allowing to move said switch lever between a blocking position and a release position;
      a slider received on said switch lever allowing shifting said slider between said blocking and said release positions, said slider being biased into said blocking position;
      a blocking element received on said slider, said blocking element cooperating with a counter element received on said housing for blocking said slider within said blocking position against moving of said switch lever into said activated position and for allowing moving said switch lever into said activated position upon shifting said slider into said release position;
      an activation element received on said slider protruding through a recess provided on said switch lever for being accessible from the outside; and
      a latching element arranged on said slider cooperating with a counter element received in said housing for allowing latching said switch lever when being in its activated position;
   wherein said switch lever can only be moved into said activated position, when said locking arrangement is in said release position;
   wherein said latching element is configured for latching with said counter element when said slider is shifted against said bias into said latching position.

2. The hand-held tool machine of claim 1, further comprising a pivot axis, whereon said switch lever is held pivotably at one end thereof, and further comprising a first spring for biasing said switch lever into the direction of said non-activated position.

3. The hand-held tool machine of claim 1, wherein said blocking element is configured as a step protruding from said slider and resting against an assigned protrusion arranged on said housing when being in said blocking position.

4. The hand-held tool machine of claim 1, wherein said activation element is configured as a knob being configured for displacing said slider between said blocking position and said release position by means of a finger of a user.

5. The hand-held tool machine of claim 2, further comprising a second spring for biasing said slider into said latching position, and wherein said latching element is arranged on said slider being configured for latching with said counter element when said slider is shifted against a force exerted by said second spring into said latching position.

6. The hand-held tool machine of claim 5, wherein said switching arrangement in said latching position of the switch lever allows for a further pivoting against said bias of said first spring into a release position within which said latching element is released from said counter element, thereby moving into the direction of said blocking position by means of said second spring.

7. The hand-held tool machine of claim 1, wherein said switch comprises a switch plunger being arranged for switching by means of said switch lever, when said switch lever is moved into said activated position.

8. The hand-held tool machine of claim 1, wherein said slider can be inserted into a recess of said switch lever from an inner side facing said housing and can be biased by means of said second spring into a preassembled position allowing mounting said slider together with said switch lever in said preassembled position between two adjacent housing parts.

9. A hand-held tool machine comprising:
a housing;
a motor received within said housing for driving a tool;
a switch received within said housing for switching on and off said motor;
a switching arrangement received within said housing, said switching arrangement comprising:
a switch lever arranged pivotably between a non-activated position and an activated position for activating said switch;
a locking arrangement received on said switch lever allowing to move said switch lever between a blocking position and a release position;
a first spring for biasing said switch lever into said blocking position;
a slider received on said switch lever allowing shifting said slider between said blocking and said release positions;
a blocking element received on said slider, said blocking element cooperating with a counter element received on said housing for blocking said slider within said blocking position against moving of said switch lever into said activated position and for allowing moving said switch lever into said activated position upon shifting said slider into said release position;
a latching element received on said slider cooperating with a counter element received in said housing for allowing latching said switch lever when being in its activated position, thereby achieving a latching position;
wherein said switch lever can only be moved into said activated position, when said locking arrangement is in said release position.

10. The hand-held tool machine of claim 9, further comprising a second spring for biasing said slider into said latching position, and wherein said latching element is configured for latching with said counter element when said slider is shifted against said bias of said second spring into said latching position.

11. The hand-held tool machine of claim 10, wherein said slider comprises an activation element protruding through a recess provided on said switch lever for being accessible from outside.

12. The hand-held tool machine of claim 9, wherein said blocking element is configured as a step protruding from said slider and resting against an assigned protrusion arranged on said housing when being in said blocking position.

13. The hand-held tool machine of claim 9, wherein said switch comprises a switch plunger being arranged for switching by means of said switch lever, when said switch lever is moved into said activated position.

14. A hand-held tool machine comprising:
a housing;
a motor received within said housing for driving a tool;
a switch received within said housing for switching on and off said motor;
a switching arrangement received within said housing, said switching arrangement comprising:
a switch lever that can be moved between a non-activated position and an activated position for activating said switch;
a locking arrangement received on said switch lever allowing to move said switch lever between a blocking position and a release position;
a slider received on said switch lever allowing shifting said slider between said blocking and said release positions;
a blocking element received on said slider, said blocking element cooperating with a counter element received on said housing for blocking said slider within said blocking position against moving of said switch lever into said activated position and for allowing moving said switch lever into said activated position upon shifting said slider into said release position;
a latching element received on said slider cooperating with a counter element received in said housing for allowing latching said switch lever when being in its activated position;
wherein said switch lever can only be moved into said activated position, when said locking arrangement is in said release position.

15. The hand-held tool machine of claim 14, further comprising a pivot axis, whereon said switch lever is held pivotably at one end thereof, and further comprising a first spring for biasing said switch lever into the direction of said non-activated position.

16. The hand-held tool machine of claim 14, wherein said blocking element is configured as a step protruding from said slider and resting against an assigned protrusion arranged on said housing when being in said blocking position.

17. The hand-held tool machine of claim 14, wherein said activation element is configured as a knob being configured for displacing said slider between said blocking position and said release position by means of a finger of a user.

18. The hand-held tool machine of claim 15, wherein said slider is biased by means of a second spring into said blocking position, and wherein said latching element is arranged on said slider being configured for latching with said counter element when said slider is shifted against said spring bias into said latching position.

19. The hand-held tool machine of claim 18, wherein said switching arrangement in said latching position allows for a further pivoting of said switch lever against said bias of said first into a release position within which said latching element is released from said counter element, thereby moving into the direction of said blocking position by means of said bias of said second spring.

20. The hand-held tool machine of claim 14, wherein said switch comprises a switch plunger being arranged for switching by means of said switch lever, when said switch lever is moved into said activated position.

* * * * *